United States Patent [19]

Suzuki et al.

[11] Patent Number: 4,616,913

[45] Date of Patent: Oct. 14, 1986

[54] CAMERA

[75] Inventors: Masayuki Suzuki; Hidehiko Fukahori; Masaharu Kawamura; Yoshihito Harada; Ryuichi Kobayashi, all of Kanagawa; Tsunemasa Ohara, Tokyo, all of Japan

[73] Assignee: Canon Kabushiki Kaisha, Tokyo, Japan

[21] Appl. No.: 739,383

[22] Filed: May 30, 1985

[30] Foreign Application Priority Data

May 30, 1984 [JP] Japan ................................ 59-110062

[51] Int. Cl.[4] ................................................ G03B 1/18

[52] U.S. Cl. ................................................ 354/173.1

[58] Field of Search ......................... 354/173.1, 173.11

[56] References Cited

U.S. PATENT DOCUMENTS

| | | | |
|---|---|---|---|
| 2,969,722 | 1/1961 | Schwartz | 354/173.1 |
| 3,126,803 | 3/1964 | Hintze | 354/173.1 |
| 3,135,182 | 6/1964 | Hintze et al. | 354/173.1 |
| 4,405,221 | 9/1983 | Yoshida et al. | 354/173.1 |

*Primary Examiner*—Donald A. Griffin

*Attorney, Agent, or Firm*—Toren, McGeady, Stanger, Goldberg & Kiel

[57] ABSTRACT

A multi-motor driven camera in which the shutter-charging drive torque transmission is provided with a first electric motor, the film winding drive torque transmission with a second electric motor, and the film rewinding drive torque transmission with a third electric motor whereby a charging system of high efficiency can be formed.

13 Claims, 8 Drawing Figures

F I G.4
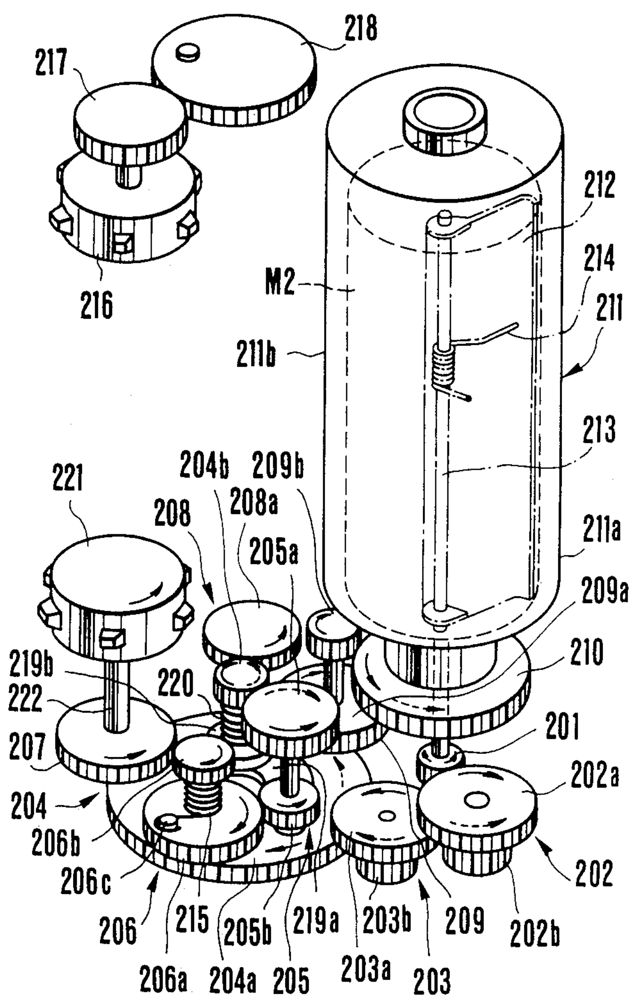

CAMERA

BACKGROUND OF THE INVENTION

1. Field of the Invention

This invention relates to motor driven cameras capable of motorized shutter charging, film winding and rewinding.

2. Description of the Prior Art

Recently, as the technique of motorizing the camera has advanced, cameras capable of motorized film winding and rewinding name been proposed. This kind of camera is constructed in such a way that the driving torque transmission from the electric motor to the takeup spool is provided with a change-over mechanism or clutch at a cross point to another transmission to the supply spool so that only one motor is used for performing the winding and rewinding operations as the change-over mechanism selects either one of them.

In general, the winding and rewinding systems of the camera lie at opposite ends of the camera body with the lens intervening therebetween. For example, in the single lens reflex camera, as viewed from the holding position of the camera, on the right hand side there is the winding mechanism, and on the left hand side is the rewinding mechanism. Also, the right hand end portion of the camera housing contains the electric motor adjacent the winding mechanism. A recent trend is to form the right hand end portion protruding forward to accommodate that motor and to make it usable as a grip with the advantage of improving steadiness while holding the camera. This is widely used even in single lens reflex cameras. In order to provide in such a motoried winding camera a motorized rewinding capability, a change-over mechanism must be arranged between the electric motor and the winding and charging system, and the driving torque through the change-over mechanism must be transmitted to the opposite side of the mirror box on which the rewinding mechanism lies. This transmission is usually in the form of a train of gears. Because of the limitations on the width of the camera housing, and because the speed reduction rate is in a range determined by the load and the output of the motor, the required number of gears from the output shaft of the motor to the output terminal end at the hub of the film cassette is about 12 to 16. For such a large number of gears in successive connection, the transmission efficiency is very low, or about 20 to 30%.

Also there is prior art proposing the use of a motor driven winding device for charging the shutter, resetting the lens drive mechanism, and carrying out other operations necessary to make the camera ready for the next exposure, or in other words, performing all the charging operations by one motor. Of these charging operations, the shutter charging and the lens charging operations are always with almost stable loads independent of variations of the ambient temperature. But, as to the film winding operation, its load varies depending on the lot number for production of films, the types of film, and the ambient temperature. It is known that the minimum and maximum values of that load differ by about a factor of 5 from each other. In such a way, according to the prior known proposals, the mechanisms of different character were charged at a time. Therefore, stress was applied on the motor and the battery, giving rise to a problem preventing charging with good efficiency.

SUMMARY OF THE INVENTION

A first object of the invention is to provide a charge system of better efficiency than in the prior art, thereby enabling use of a small electrical power source or battery.

A second object of the invention is to achieve a minimization of the bulk and size of the camera body by deleting a great number of transmitting gears from the rewinding transmission system.

A third object of the invention is to make it easy to perform multiple exposure photography.

Other objects of the invention will become apparent from the following detailed description of embodiments thereof taken hereinafter by reference to the accompanying drawings.

BRIEF DESCRIPTION OF THE DRAWINGS

FIGS. 3, 4 and 5 are perspective views illustrating the construction and arrangement of the elements of the various motors, their speed reduction mechanisms and the transmission systems shown in FIG. 1.

DETAILED DESCRIPTION OF THE PREFERRED EMBODIMENTS

Figure 1:
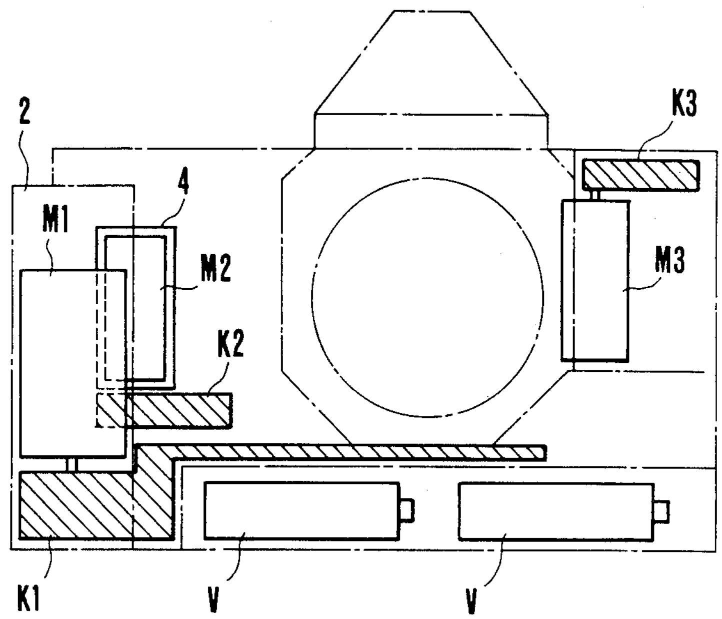
FIG. 1 is a schematic view looking from the front of a camera of the layout of various motors, speed reduction mechanisms and transmission systems of an embodiment of a camera according to the present invention.
Figure 2:
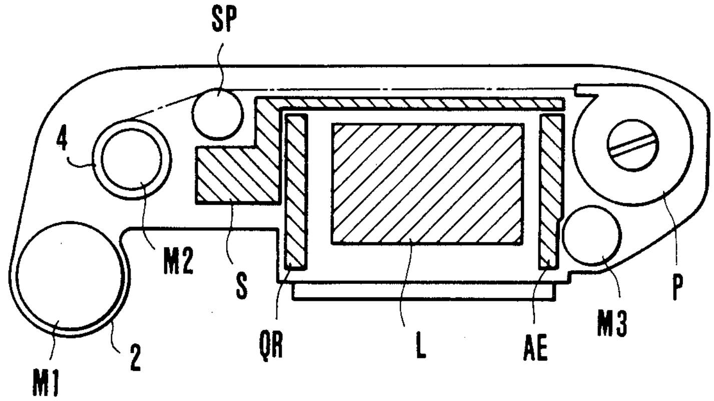
FIG. 2 is a schematic view looking from the top of the camera of FIG. 1 of the same layout of the various motors, reduction mechanisms and transmission systems.

In FIGS. 1 and 2 there is shown one embodiment of the invention, where a first electric motor M1 governs charging mechanisms for the shutter, lens drive mechanism and mirror mechanism and is positioned at the left hand side of the camera interior as viewed from the front of the camera. Because these charging mechanisms impose upon the motor M1 a load that, though varying to a small extent as the environmental conditions largely change, is absolutely large in value, a motor of relatively large size must be selected for employment as the motor M1. For this reason, to accommodate it, the left hand end portion of the front panel of the camera housing is formed with a forward projection 2 with its interior functioning as a chamber for the motor M1. Without having to sacrifice the conventional image for the camera body, therefore, it is made possible to employ the relatively large motor. It should be noted that this projection 2 serves as a grip to improve steadiness while holding the camera. The motor M1 is associated with a driving torque transmission system K1 including a speed reduction mechanism. A second electric motor M2 is mounted in the shaft of a film takeup spool 4 and is used for winding up film. Recently, the auto-loading capability of film has found use in many cameras. In this case, to enhance the reliability of loading, the diameter of the spool shaft 4 is increased to more than about 16 mm. The use of the interior of the spool hub 4 as a chamber for the motor M2 enables utilization of the space advantageously, and, because it lies near the film winding mechanism and speed reduction mechanism, provides additional advantages improving the efficiency of transmission and simplifying the structure of the mechanism. The motor M2 is associated with a driving torque transmission system K2 including a speed reduction mechanism. A third electric motor M3 is used for rewinding the film and is positioned in the right hand end portion of the camera interior as viewed from the front of the camera, or adjacent a chamber for the film cassette. This motor M3 is associated with a driving torque transmission system K3 including a speed reduction mechanism. Because the distance from the output shaft of the motor M3 to the hub of the film supply spool is very short, the total efficiency of the speed reduction and torque transmission system is very high, being capable of reaching 70°-85°.

An electrical power source V has four single 3 type batteries. The current supply control circuit from these batteries V to the aforesaid three motors M1, M2 an M3 be of known construction in the art and is not further explained here.

FIG. 2 in a view of the camera of FIG. 1 from above and illustrates the spacing of all the motors in relation to the film cassette P, the shuter S of vertically running blade type, the quick return mirror OR, the diaphragm control medhanism AE, the lens drive mechanism, L and a sprocket SP for advancing the film one frame at a time.

Figure 3:
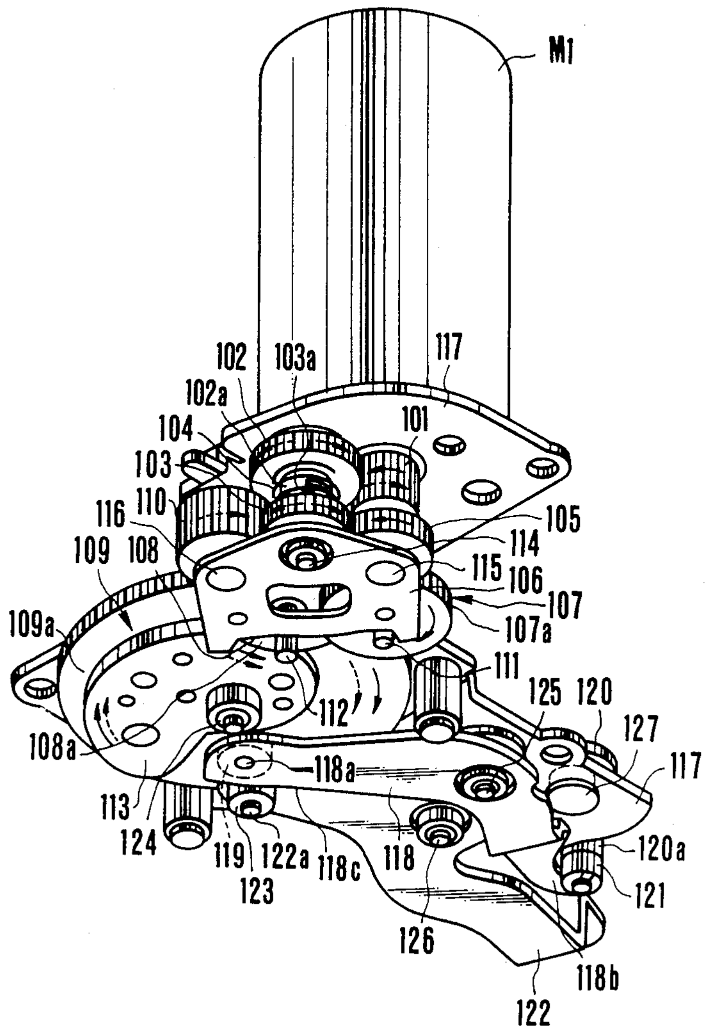

FIG. 3 illustrates the details of the speed reduction mechanism for the motor M1 and the transmission system K1.

A pinion gear 101 is fixedly mounted to the output shaft of the motor M1 in the grip 2. Gears 102 and 103 constitute a 2-stage gear, and are rotatable independently of each other on a common shaft 114 fixedly mounted to a base plate 117. These gears 102 and 103 have hubs 102*a* and 103*a* projected oppositely to each other in a thrust direction so that as the hubs 102*a* and 103*a* engage with each other, the gears 102 and 103 rotate in unison, but they are freed from each other in the thrust direction. The bottom face of the gear 103 is in contact with a planetary lever 106. A compression spring 104 between the gears 102 and 103 causes a frictional force to be exerted on the lever 106 so that the lever 106 turns to follow the gear 103. A gear 105 is rotatably supported on a shaft 115 fixedly mounted to the planetary lever 106 and always meshes with the gear 103. A large gear 107*a* and a small gear 107*b* (the latter is not shown but is formed above the large gear 107*a*) are fixedly secured to each other and constitute a 2-stage gear 107 rotatably mounted on a shaft 111 which is fixedly mounted to the base plate 117. When the gear 103 rotates in a clockwise direction along with counterclockwise movement of the gear 105, the planetary lever 106 turns in a clockwise direction, whereby the large gear 107*a* is brought into engagement with the gear 105. A gear 108 rotatably mounted on a shaft 112 is fixedly mounted to the base plate 117 and comprises a large gear 108*a* and a small gear 108*b* (though not shown, the latter is formed above the large gear 108*a*) in fixedly secured relation to each other. The large gear 108*a* always meshes with the small gear 107*b*. A gear 110 is rotatably mounted on a shaft 116 which is fixedly mounted to the planetary lever 106, and always meshes with the gear 103. This gear 110 is arranged to mesh with the large gear 107*a* when the gear 103 rotates in a counterclockwise direction and the planetary gear 106 turns in the counterclockwise direction. A cam gear 109 is rotatably mounted on a shaft 124 which is fixedly mounted to the base plate 117, and has a gear 109*a* and a cam 113 formed therein. This gear 109*a* always meshes with the small gear 108*b*. The driving torque transmission system beginning with the pinion 101 and terminating at the cam gear 109 is changed over depending upon the direction of rotation of the motor M1. In more detail, when the motor M1 rotates in the counterclockwise direction, the planetary lever 106 turns in the clockwise direction to establish a transmission path: pinion gear 101→gear 102 with gear 103→gear 105→gear 107 (large gear 107*a* with small gear 107*b*)→gear 108 (large gear 108*a* with small gear 108*b*)→cam gear 109, that is, a gear train of a high speed reduction rate. On the other hand, when the motor M1 rotates in the clockwise direction, the planetary lever 106 turns in the counterclockwise direction to establish another transmission path: pinion gear 101→gear 102 with gear 103→gear 110→gear 108 (large gear 108*a* with small gear 108*b*)→cam gear 109, that is a gear train of a low reduction rate. The aforesaid two gear trains are so arranged that the cam gear 109 rotates always in the clockwise direction no matter what direction the rotation of the motor M1 may take.

A first shutter charging lever 118 is pivotally mounted about a pin 125 mounted on the base plate 117 and carries a roller 119 on a shaft 118*a* at one arm end, the opposite arm of which has a cam 118*b*. The roller 119 rides on the camming surface of the cam 113 of the gear 109 and, as it follows the displacement of the camming surface, gives the lever 118 the corresponding swinging movement. By this swinging movment, the cam 118*b* is also caused to swing. A second shutter charging lever 120 is pivotally mounted about a pin 127 which is fixedly mounted to the base plate 117 and carries a roller 121 on a shaft 120*a* fixedly mounted thereto. The roller 121 rides on the camming surface 118*b* so that swinging movement of the first shutter charging lever 118 causes swinging movement of the second shutter charging lever 120 which in turn causes a shutter unit (not shown) of known construction to be charged.

A lever 122 for charging a lens drive system (not shown) of known construction is pivotally mounted at a pin 126 which is fixedly mounted to the base plate 117, and carries a roller 123 on a shaft 122*a* fixedly mounted to one arm end thereof. This roller 123 is in contact with the cam 118*c* of the first shutter charging lever 118 so that this lever also follows the swinging movement of the first shutter carging lever 118, while charging the lens drive system.

FIG. 4 illustrates the details of the aforesaid second motor M2 and its speed reduction mechanism and transmission system.

A pinion gear 201 is fixedly mounted on an output shaft of the motor M2 in the interior of the spool shaft 211. A 2-stage gear 202 has a large gear 202*a* and a small gear 202*b* and is rotatably mounted. Another 2-stage gear 203 has a large gear 203*a* and a small gear 203*b* and is rotatably mounted. Another 2-stage gear 204 has a large gear 204*a* and a small gear 204*b* and is rotatably mounted. On the shaft of this gear 204 is pivotally mounted a planetary lever 219*a* through a bearing 219*b*.

A compression spring 220 between the aforesaid small gear 204*a* and the bearing 219*b* creates friction at the interface between the bearing 219*b* and the large gear 204*a*. By this friction, the planetary lever 219*a* is caused to follow the direction of rotation of the 2-stage gear 204. The speed of rotation of the motor M2 is reduced as the motion is transmitted as follows: pinion gear 201→2-stage gear 202 (large gear 202*a* with small gear 202*b*)→2-stage gear 203 (large gear 203*a* with small gear 203*b*)→2-stage gear 204 (large gear 204*a* with small gear 204*b*). Rotatably mounted on the planetary lever 219*a* are a 2-stage gear 205 having a large gear 205*a* and a small gear 205*b* and another 2-stage gear 208 having a large gear 208*a* and a small gear 208*b* (though not shown, the latter is positioned beneath the large gear 208*a*). A 2-stage gear 206 is positioned adjacent the 2-stage gear 205 and is rotatably mounted, with a large gear 206*a* and a small gear 206*b* being rotatable independently of each other. A coil spring 215 lies between the large and small gears 206*a* and 206*b* to function as a one-way clutch. One end of the coil spring 215 is fixedly secured to a boss 206*c* of the large gear 206*a* so that as the large gear 206*a* rotates in a clockwise direction, the coil spring 215 bits the hub of the small gear 206*b* and rotates the small gear 206*b*. A gear 207 always meshes with the small gear 206*b* and rotates a sprocket 221 through a shaft 222.

On the other hand, positioned adjacent the aforesaid 2-stage gear 208 is a 2-stage gear 209. This 2-stage gear 209 has a large gear 209*a* and a small gear 209*b* and is rotatably mounted. A spool gear 210 is fixedly secured to a body 211*a* of a spool 211 and meshes with the aforesaid small gear 209*b*. This spool 211 has a rubber member 211*b* adhered to the entire surface of the body 211*a* to facilitate automatic convolution of film on the spool shaft 211*a*. Further positioned adjacent the spool 211 is a cover 212 pivotally mounted at a shaft 213 which is fixedly secured to the camera housing. A spring 214 urges the cover 212 toward the spool 211 and performs the function of assisting in automatic convolution of film onto the spool 211.

A sprocket 216 is arranged upon engagement in the perforations of the film to be driven to move only by the film. Rotation of this sprocket 216 is transmitted through its own shaft to a gear 217 and further therefrom to another gear 218 meshing therewith to detect whether or not the film is being fed and how long the film has been advanced.

When the driving torque from the motor M2 is transmitted, at first, when the motor rotates in a counterclockwise direction, the 2-stage gear 204 is rotated in the clockwise direction through the gears 202 and 203, whereby the planetary lever 219*a* is turned in the clockwise direction to bring the small gear 205*b* into mesh with the large gear 206*a* and at the same time the small gear 208*b* into mesh with the large gear 209*a*. Therefore, rotation of the motor M2 is transmitted through two paths: first through a path including pinion gear 201→2-stage gear 202 (large gear 202*a* with small gear 202*b*)→2-stage gear 203 (large gear 203*a* with small gear 203*b*)→2-stage gear 204 (large gear 204*a* with small gear 204*b*)→2-stage gear 205 (large gear 205*a* with small gear 205*b*)→2-stage gear 206 (large gear 206*a* small gear 206*b*)→gear 207→drive sprocket 221 and second through a path including 2-stage gear 204 (large gear 204*a* with small gear 204*b*)→2-stage gear 208 (large gear 208*a* with small gear 208*b*)→2-stage gear 209 (large gear 209*a* with small gear 209*b*)→spool gear 210→spool 211.

Conversely when the motor M2 rotates in the clockwise direction, the aforesaid 2-stage gear 204 is rotated in the counterclockwise direction, whereby the planetary lever 219*a* is turned in the counterclockwise direction. At this time, therefore, the large gear 205*a* meshes directly with the spool gear 210. Therefore, rotation of the motor M2 is transmitted through a path: pinion gear 201→2-stage gear 202 (large gear 202*a* with small gear 202*b*)→2-stage gear 203 (large gear 203*a* with small gear 203*b*)→2-stage gear 204 (large gear 204*a* with small gear, 204*b*)→large gear 205*a*→spool gear 210→spool 211. It should be noted that the transmission to the drive sprocket 221 is cut off by the clockwise movement of the motor M2, and the sprocket 221 is rendered freely rotatable.

The transmission to the spool 211 is changed over between two values of the speed reduction rate depending on the direction of rotation of the motor M2. That is, when the motor M2 rotates in the counterclockwise direction, the speed reduction rate is high. When in the clockwise direction, it becomes low. No matter which direction the rotation of the motor M2 may take, the spool 211 rotates always in the counterclockwise direction.

This speed reduction mechanism and transmission system K2 for the motor M2 operates in such a manner that when in auto-loading, the direction of rotation of the motor M2 is counterclockwise so that the drive sprocket 221 rotates at a slow speed, and after that to advance the exposed film frames successively, the motor M2 is made to rotate in the clockwise direction, causing the spool 211 alone to rotate at a high speed to transport the film.

Figure 5:
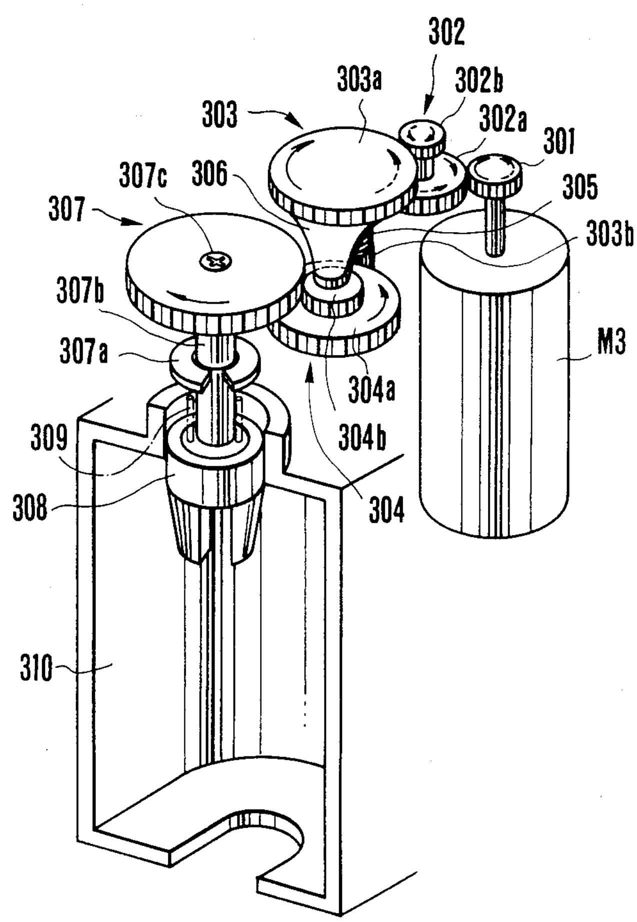

FIG. 5 illustrates the details of the aforesaid third motor M3 and its speed reduction mechanism and transmission system.

A pinion gear 301 is fixedly mounted on the output shaft of the motor M3. A 2-stage gear 302 has a large gear 302*a* and a small gear 302*b* and is rotatably mounted. Another 2-stage gear 303 has a large gear 303*a* and a small gear 303*b* and is rotatably mounted. A planetary lever 306 is pivotally mounted on the common shaft of the large gear 303*a* and the small gear 303*b* and is given a friction against the large gear 303*a* by a compression spring 305 between these gears 303*a* and 303*b*. By this friction, the planetary lever 306 is caused to turn in the same direction as the direction of rotation of the 2-stage gear 303. It should be noted that a 2-stage gear 304 comprising a large gear 304*a* and a small gear 304*b* is rotatably mounted at the free end of the planetary lever 306. A gear 307 is mounted on one end of a shaft 307*b* by a screw 307*c*, and a fork 308 is mounted to the other end of this shaft 307*b*. This fork 308 extends into a film cassette chamber 310 and is engageable with the hub of a supply spool (not shown) in the cassette. Also, a coil spring 309 turns around the shaft 307*b* and is compressed between a washer 307*a* and the fork 308 so that the fork 308 can temporarily retract so as to make it easy when the film cassette is inserted into the chamber 310.

When the motor M3 rotates in a clockwise direction, the 2-stage gear 303 is rotated in a clockwise direction through the pinion gear 301 and gear 302, whereby the planetary lever 306 is turned in the clockwise direction to bring the small gear 304*b* into mesh with the gear 307. Therefore, the driving torque is transmitted through a path: pinion gear 301→2-stage gear 302 (large gear 302a with small gear 302b)→2-stage gear 303 (large gear 303a with small gear 303b)→2-stage gear 304 (large gear 304a with small gear 304b)→gear 307→fork 308. Conversely when the motor M3 rotates in the counterclockwise direction, the 2-stage gear 303 is rotated in the counterclockwise direction, whereby the planetary lever 306 is turned in the counterclockwise direction to take the small gear 304b out of mesh with the gear 307. Thus, motion of the motor M3 does not reach the fork. Therefore, by letting the motor M3 rotate in the counterclockwise direction to some angle, it is made possible to prevent the motor M3 from placing a load on the film when the film is being wound up by the motor M2.

As has been described above, the present embodiment uses different motors with different loads to charge and different places of the mechanisms to be charged, thereby giving advantages of enabling charging mechanisms suited to the respective loads to be employed, and reducing the mass and the complexity of structure of the total sum of the transmission systems with a great increase in the efficiency. Another advantage arising from the use of the respective individual motors for the film winding system and the other charging system necessary to recycle the exposure operation is that the perfect multiple exposure operation which was heretofore very difficult to perform can be carried out very easily as the film winding motor M2 is rendered inoperative.

Also, in the embodiment described above, because the motor M1 is installed in the grip 2 and the motor M2 in the spool body 4, a large contribution to minimize the bulk and size of the camera can be made.

Further, in this embodiment, the changing over between the two values of speed reduction rate and the two paths of transmission can be performed by changing the direction of rotation of each of the motors M1 to M3. Therefore, various operations of the camera according to the situation can be effected.

Figure 6:
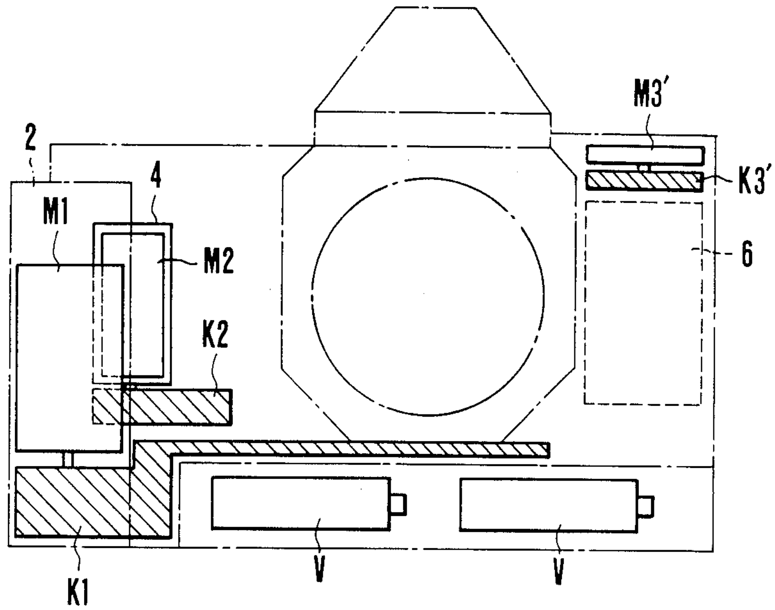
FIG. 6 is a schematic front elevational view of the layout of various motors and their speed reduction mechanism and transmission systems of another embodiment of the camera according to the present invention.

FIG. 6 is a view looking from the front of the camera and illustrates another embodiment of the motor arrangement according to the present invention, which is different from the above-described embodiment in that the motor for use in the rewind mode is replaced by a flat small size motor M3' and this motor M3' is positioned above the film cassette chamber 6. In the figure, K3' is a transmission system for the aforesaid flat small size rewinding motor M3'. The other features are similar to those of the first embodiment, and are not explained further.

Figure 7:
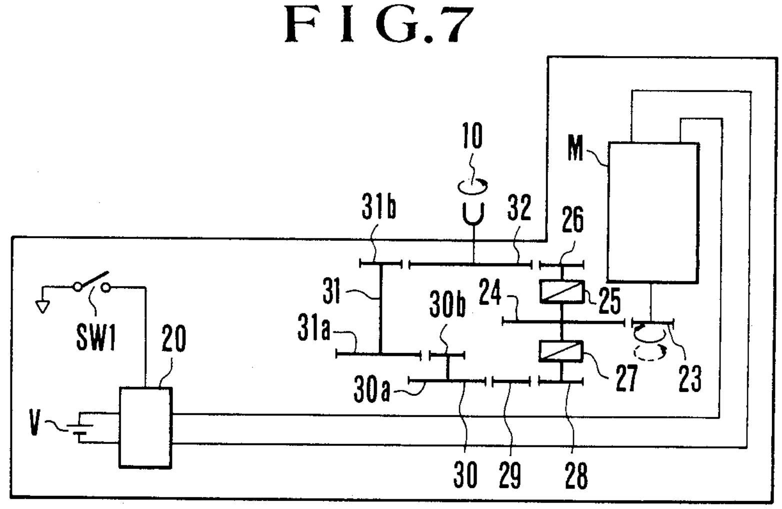
FIG. 7 is a schematic diagram of the overall form of another example of the speed reduction rate change-over mechanisms shown in FIGS. 3 and 4.
Figure 8:
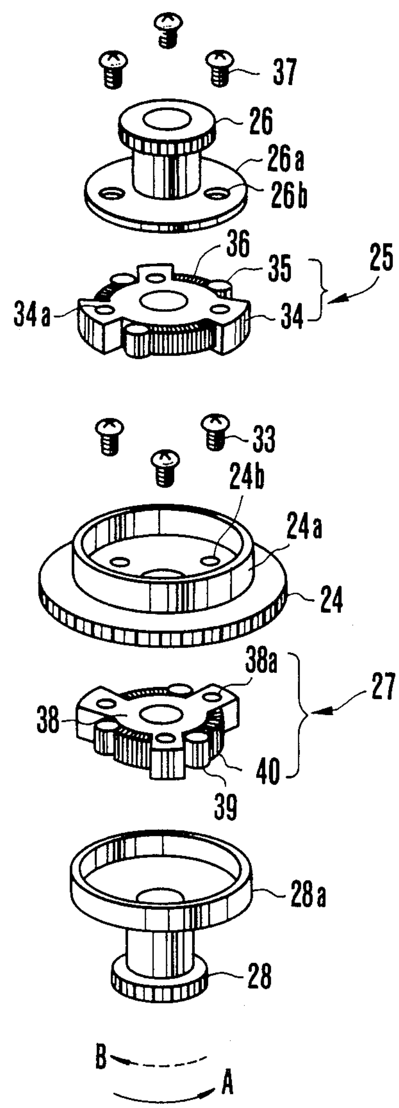
FIG. 8 is an exploded perspective view of the main parts of FIG. 7.

FIGS. 7 and 8 illustrate another practical example of the speed reduction rate change-over mechanism responsive to the direction of rotation of the motor. This example is applicable to any of the speed reduction and driving torque transmission systems K1, K2 and K3 for the motors M1, M2 and M3. FIG. 7 schematically illustrates the arrangement of all elements of the speed reduction rate change-over mechanism, wherein 23 is a first gear fixedly mounted on the output shaft of the motor M, and 24 is a second gear meshing with the first gear 23 and drivingly connected to two one-way clutches 25 and 27 as shown in FIG. 8. The details of the construction of the first and second one-way clutches 25 and 27 are shown in FIG. 8. A third gear 26 is connected to the first one-way clutch 25. A fourth gear 28 is connected to the second one-way clutch 27. A fifth gear 29 meshes with both of the fourth gear 28 and a sixth gear 30. The sixth gear 30 is a 2-stage gear comprising a first gear portion 30a meshing with the fifth gear 29 and a second gear portion 30b meshing with a seventh gear 31. The seventh gear 31 is a 2-stage gear comprising a first gear portion 31a meshing with the sixth gear 30 and a second gear portion 31b meshing with a winding up gear 32. The winding up gear 32 meshes with both of the seventh gear 31 and the third gear 26 and bears an output shaft 10 on the upper surface thereof. Also, 20 is a control circuit for the motor M; SW1 is a switch for changing over the rotation of the motor m; V is an electrical power source.

The one-way clutch shown in FIG. 8 is constructed with a first one-way clutch 25 arranged between the aforesaid third gear 26 and second gear 24 and a second one-way clutch 27 arranged between the fourth gear 28 and the second gear 24. An annular portion 24a is provided on the upper surface of the second gear 24. Holes 24b are formed in this second gear 24 through which screw fasteners 33 extend into holes 38a of a wind mill 38. Also the lower surface of the third gear 26 is provided with a flange portion 26a and holes 26b, and a windmill 34 of the clutch 25 is fixedly secured at holes 34a by screws 37. Further, the upper surface of the fouth gear 28 is provided with a cylindrical portion 28a whose inner surface confronts rollers 39 of the windmill 38 of the second one-way clutch 27. Similarly, the inner surface of the cylindrical portion 24a of the second gear 24 confronts rollers 35 of the windmill 34 of the first one-way clutch 25. 36 and 40 are springs.

The operation of this one-way clutch is explained in more detail below. When the motor M rotates in a direction indicated by dashed line arrow, the second gear 24 rotates in a direction of arrow B, and the windmill 38 fixedly secured thereto also rotates as a unit therewith. Thereby the rollers 39 are constrained between the springs 40 of the windmill 38 and the inner peripheral surface of the cylindrical portion 28a of the fourth gear 28 so that the windmill 38 and the fourth gear 28 rotate as a unit. Therefore, the second gear 24 and the fourth gear 28 rotate as a unit, transmitting the driving torque therethrough. That is, the one-way clutch 27 is in the coupled condition. Meanwhile, when the second gear 24 rotates in the direction B, the rollers 35 of the clutch 25 act in a direction to escape between the inner peripheral surface of the cylindrical portion 24a and the springs 36 of the windmill 34 so that despite the fact that the second gear 24 rotates, the third gear 26 does not rotate. That is, the one-way clutch 25 is in the isolated condition.

Next, when the motor rotates in the direction indicated by solid line arrow, the second gear 24 rotates in the direction of arrow A. In this case, the direction of rotation of the second gear 24 is reverse to that described above, so that it is between the springs 40 of the windmill 38 and the inner surface of the cylindrical portion 28a that the rollers 39 act in a direction to escape, and it is between the inner surface of the cylindrical portion 24a and the windmill 34 that the rollers 35 act in a direction to constrain. Therefore, when the second gear 24 rotates in the direction of arrow A, the one-way clutch 25 couples so that the second gear 24 and the third gear 26 rotate in unison, transmitting the driving torque therethrough. On the other hand, the one-way clutch 27 cuts off, so that the fourth gear 28 does not rotate. Such a one-way clutch arrangement, that is, the coaxial arrangement of the gears 24, 26 and 28 and the one-way clutches 25 and 27 when driven to rotate in either one of the directions A and B depending on the normal or reverse direction of rotation of the motor M renders the corresponding one of the one-way clutches 25 and 27 operative to transmit the driving torque therethrough. Therefore, as the motor M is changed over between the normal and reverse direction by operating the switch SW1, the speed reduction rate at the output shaft 10 can be changed over between two values.

The feature of the embodiment of FIGS. 7 and 8 is that the speed reduction rate from the motor M to the output shaft 10 can be changed as necessity arises. Therefore, when the voltage value of the battery V is high, the charging of the various mechanisms or the rewinding can be performed at a high speed. On the other hand, when the voltage is lowered, as the speed reduction rate is changed, the charging of the various mechanism or the rewinding may be performed at a slow speed with a decrease in the load on the motor. Also, the switch SW1 may be arranged either to be accessible from the outside of the camera so that the photographer can freely choose the mode, or to be automatically operated in response to the level of the actual voltage of the battery V.

As has been described above, according to the present invention, the transmission systems to the shutter charging, film winding and rewinding mechanisms are driven by the respective individual electric motors, thereby making it possible to perform the charging at a high efficiency. With the use of relatively small batteries, as high a driving performance as in the prior art can be obtained. In addition thereto, a perfect multiple exposure is made possible. Also, as to the motorized rewinding, because there is no need to use a large number of gears along a long path from one side of the camera to the other as in the prior art, it is made possible to reduce the height of the camera housing and also to perform the motorized rewinding at an improved efficiency. Because both of the winding and rewinding operate with high efficiency, despite the fact that the electrical power source is small, a high speed winding or rewinding becomes possible to perform, contributing to a broadening of the photographic capabilities of the camera.

While specific embodiments of the invention have been shown and described in detail to illustrate the application of the inventive principles, it will be understood that the invention may be embodied otherwise without departing from such principles.

What is claimed is:

1. A camera comprising:

(a) a shutter charging transmission system;

(b) a first electric motor for driving at least said shutter charging transmission system;

(c) a film winding transmission system;

(d) a second electric motor for driving at least said film winding transmission system;

(e) a film rewinding transmission system; and (f) a third electric motor for driving said film rewinding transmission system.

2. A camera according to claim 1, wherein at least one of said three transmission systems includes a change-over mechanism for changing the transmission path as the direction of rotation of said electric motor is changed over.

3. A camera according to claim 2, wherein said transmission paths have different speed reduction ratios.

4. A camera according to claim 2, wherein said transmission paths have a transmission path until the final stage and another path in which transmission is cut off at an intermediate stage.

5. A camera according to claim 2, wherein, said change-over mechanism includes a planetary clutch.

6. A camera having a camera body comprising:

(a) a shutter charging transmission system;

(b) a first electric motor for driving at least said shutter charging transmission system, this first electric motor being arranged in a grip formed as projecting forwardly of the camera body:

(c) a film winding transmission system;

(d) a second electric motor for driving at least said film winding transmission system, this second electric motor being arranged on a spool side of the camera body;

(e) a film rewinding transmission system; and (f) a third electric motor for driving said film rewinding transmission system, this third electric motor being arranged on a rewind shaft side of the camera body.

7. A camera according to claim 6, wherein at least one of said three transmission systems includes a change-over mechanism for changing the transmission path as the direction of rotation of said electric motor is changed over.

8. A camera according to claim 7, wherein said transmission paths have different speed reduction ratios.

9. A camera according to claim 7, wherein said transmission paths have a transmission path until the final stage and another path in which transmission is cut off at an intermediate stage.

10. A camera according to claim 7, wherein said changeover mechanism includes a planetary clutch.

11. A camera according to claim 6, wherein said shutter charging transmission system is arranged in a bottom portion of the camera body.

12. A camera according to claim 6, wherein said second electric motor is arranged in said spool.

13. A camera according to claim 6, wherein said third electric motor is arranged adjacent to a cassette chamber.

* * * * *